(12) United States Patent
Detry

(10) Patent No.: US 10,668,538 B2
(45) Date of Patent: Jun. 2, 2020

(54) METHOD FOR PRODUCING AN ABRADABLE TURBOMACHINE SEAL

(71) Applicant: Safran Aero Boosters SA, Herstal (Milmort) (BE)

(72) Inventor: Brigitte Detry, Namur (BE)

(73) Assignee: SAFRAN AERO BOOSTERS SA (BE)

( * ) Notice: Subject to any disclaimer, the term of this patent is extended or adjusted under 35 U.S.C. 154(b) by 217 days.

(21) Appl. No.: 15/681,090

(22) Filed: Aug. 18, 2017

(65) Prior Publication Data

US 2018/0056397 A1 Mar. 1, 2018

(30) Foreign Application Priority Data

Aug. 31, 2016 (BE) .................................. 2016/5670

(51) Int. Cl.
*B22F 5/00* (2006.01)
*B30B 15/02* (2006.01)
(Continued)

(52) U.S. Cl.
CPC .............. *B22F 5/009* (2013.01); *B22F 3/004* (2013.01); *B22F 3/02* (2013.01); *B22F 3/14* (2013.01);
(Continued)

(58) Field of Classification Search
CPC .. B22F 5/009; B22F 3/004; B22F 3/02; B22F 3/14; B22F 3/12; B22F 2301/052;
(Continued)

(56) References Cited

U.S. PATENT DOCUMENTS 2,329,288 A * 9/1943 Miller .................... C11D 13/14
264/297.1
4,390,489 A * 6/1983 Segal ...................... B29B 11/04
264/126
(Continued)

FOREIGN PATENT DOCUMENTS

EP 2842666 A1 3/2015
EP 2799165 B1 * 6/2016 ............. C22C 21/00
FR 2993577 A1 1/2014

OTHER PUBLICATIONS

Nishida, T., Nakano, H., & Urabe, K. (1993). Preparation and characterization of polycrystalline alumina with small grain size. Journal of European Ceramic Society, 12(3), 197-203 (Year: 1993).*
(Continued)

*Primary Examiner* — Anthony J Zimmer
*Assistant Examiner* — Ricardo D Morales
(74) *Attorney, Agent, or Firm* — Sanberg Phoenix & von Gontard P.C.

(57) ABSTRACT

A method for producing an abradable seal for a turbomachine, such as a turbojet engine low-pressure compressor. The method comprises the following steps performed as follows: (a) preheating of a metal mould in a furnace; (b) filling of the hot mould with a powdery aluminium-based mixture; (c) degassing of the mixture in the mould; (d) compacting of the mixture in the still-hot mould at ambient temperature, so as to solidify the mixture in the mould. The abradable seal is thus produced in angular segments that form tiles. The angular segments are then bonded into a composite casing of the turbomachine.

16 Claims, 3 Drawing Sheets

(51) Int. Cl.
   B22F 3/02    (2006.01)
   B30B 15/34   (2006.01)
   B22F 3/00    (2006.01)
   B22F 3/14    (2006.01)
   B29C 70/58   (2006.01)
   F01D 11/12   (2006.01)
   B22F 3/12    (2006.01)

(52) U.S. Cl.
   CPC ............ B29C 70/58 (2013.01); B30B 15/022 (2013.01); B30B 15/34 (2013.01); F01D 11/122 (2013.01); *B22F 3/12* (2013.01); *B22F 2301/052* (2013.01); *B22F 2301/15* (2013.01); *B32B 2581/00* (2013.01); *F05D 2230/21* (2013.01); *F05D 2240/11* (2013.01); *Y02T 50/672* (2013.01)

(58) Field of Classification Search
   CPC ... B22F 2301/15; B29C 70/58; B30B 15/022; B30B 15/34; F01D 11/122; B32B 2581/00; F05D 2230/21; F05D 2240/11; Y02T 50/672
   See application file for complete search history.

(56) References Cited

U.S. PATENT DOCUMENTS 4,937,042 A * 6/1990 Perkins ............... B22F 1/0003
                                                     419/36
2010/0124616 A1 * 5/2010 Rosenzweig ............ C23C 4/02
                                                     427/455
2015/0132175 A1 * 5/2015 Hasegawa ............... B22F 3/03
                                                     419/38
2015/0184526 A1 * 7/2015 Dudon ................... B29C 70/58
                                                     416/224

OTHER PUBLICATIONS

Pinto, Gabriel, and Mónica B. Maidana. "Conducting polymer composites of zinc-filled nylon 6." Journal of applied polymer science 82.6 (2001): 1449-1454. (Year: 2001).*

Nishida, T., Nakano, H.,& Urabe, K. (1993). Preparation and characterization of polycrystalline alumina with small grain size. Journal of the European Ceramic Society, 12(3), 197-203 (Year: 1993).*

Pinto, Gabriel, and Ana Jiménez-Martín. "Conducting aluminum-filled nylon 6 composites." Polymer Composites 22.1 (2001): 65-70 (Year: 2001).*

European Search Report from corresponding Belgium Application No. BE 201605670, dated May 18, 2017.

Nishida T Etal: "Preparation and characterization of polycrystalline alumina with small grain size" Journal of the European Ceramic Society, Elsevier Science Publishers, Barking, Essex, GB, vol. 12, No. 3, Jan. 1, 1993, pp. 197-203.

Takekawa Junjiro et al: "Effect of sintering atmospheres on the sinterability of metal injection molded compact", Funtai Oyobi Fummatsu Yakin/Journal of the Japan Society of Powder and Powder Metallurgy Feb. 1994, vol. 41, No. 2, pp. 141-145.

* cited by examiner

METHOD FOR PRODUCING AN ABRADABLE TURBOMACHINE SEAL

CROSS-REFERENCE TO RELATED APPLICATIONS

This application claims the benefit, under 35 U.S.C. § 119, of BE 2016/5670 filed Aug. 31, 2016, the disclosure of which is incorporated herein by reference in its entirety.

FIELD

The invention relates to the production of abradable seals for turbomachines. The invention also relates to a method of manufacturing a turbomachine, for example, an aeroplane turbojet engine or an aircraft turboprop, with an abradable seal.

BACKGROUND

It is known practice to use an abradable material, also referred to as a friable material, to create dynamic sealing in a turbomachine, particularly in an aeroplane turbojet engine compressor. Such a material forms the internal surface of an external casing that it lines, and disintegrates in the event of contact with rotor blade tips. This abradable material is designed to limit the wearing of the tips of the blades despite their rotational speed, which rotational speed may exceed 8000 rpm. Furthermore, the relative speed of a rotor blade tip with respect to its seal approaches the speed of sound.

It is thus possible to design a compressor while at the same time reducing the mechanical clearance between the rotor blade tips and the internal surface of the casing. Optimization may also account for expansion, centrifugal force and certain random operating variables such as ingestion and hunting phenomena. An abradable material that forms a casing coating generally comprises aluminium, silica, polyester. The method for producing the seal makes it possible to optimize the way in which the seal behaves and performs. Application to an internal shroud collaborating with wipers is also within the bounds of possibility.

It should be noted that the expression "abradable" is often used to denote a friable material capable of producing a certain degree of sealing against a surface that is able to move with respect to this material. This material may have various compositions, structures and forms. By way of example, an axial turbomachine compressor external shroud, provided with a layer of this material, is able to create a rotary seal against the tips of the rotor blades of the said compressor. That makes it possible to maintain the integrity of the entire assembly and do so despite the deformations, even small, inherent in the turbomachine, notably deformations whereby the blades or their support lengthen as a result of centrifugal forces. By reducing the clearance between the moving blades and the casing of the fluid stream as far as possible, the effectiveness and efficiency of the turbojet engine are thus increased.

Document FR 2 993 577 A1 discloses a method for producing a corrosion-resistant abradable coating. The coating forms a wearing portion bonded to the structure of a turbomachine. The coating comprises a polyester-based matrix and an aluminium alloy filler. The coating is produced in sheets by hot-moulding. However, the strength of the sheets in question remains limited.

SUMMARY

It is an objective of the invention to solve at least one of the problems posed by the prior art. More specifically, it is an objective of the invention to improve the quality of a turbomachine abradable seal. Another objective of the invention is to increase the strength of the abradable seal.

In various embodiments, the invention provides a method for producing an abradable seal in a mould, e.g., an abradable seal for a turbomachine, wherein the method comprises the following steps: (a) preheating the mould; then (b) filling the mould with a mixture, notably a powdery mixture; (d) compacting the mixture in the mould so as to solidify the mixture in the mould.

According to various advantageous embodiments of the invention, in step (a), preheating, the internal surface of the cavity of the mould which is intended to receive the mixture is covered with an aluminium foil.

According to various advantageous embodiments of the invention, step (a), preheating of the mould, comprises the heating of the mould to at least 300° C., or to at least 400° C., or to at least 500° C.

According to various advantageous embodiments of the invention, step (a), preheating of the mould, comprises heating the mould for at least 2 hours or at least 3 hours.

According to various advantageous embodiments of the invention, step (b), filling, the mixture comprises a filler, and a matrix the mass of which represents between 5% and 50% of the mass of the mixture.

According to various advantageous embodiments of the invention, the filler comprises between 20% mass and 45% mass nickel.

According to various advantageous embodiments of the invention, the filler comprises between 5% mass and 20% mass silicon.

According to various advantageous embodiments of the invention, the filler comprises between 55% mass and 80% mass aluminium.

According to various advantageous embodiments of the invention, the matrix comprises hexagonal boron nitride, or calcium fluoride, or a polymer such as polyester.

According to various advantageous embodiments of the invention, the method further comprises a step (c) of degassing the mixture in the mould, which step is performed before step (d), compacting.

According to various advantageous embodiments of the invention, the step (c), degassing, comprises at least one cycle of applying a compression force to the mixture in the mould then a release of the said compression force, step (c), degassing, in various instances comprising at least three cycles.

According to various advantageous embodiments of the invention, during at least one or each cycle, the compression force is maintained for between 1 second and 5 minutes, or between 5 seconds and 1 minute, or between 10 seconds and 30 seconds.

According to various advantageous embodiments of the invention, step (d), compacting, is performed at ambient temperature.

According to various advantageous embodiments of the invention, step (d), compacting, is performed at most 15 minutes, or at most 5 minutes, or at most 1 minute after step (a), preheating.

According to various advantageous embodiments of the invention, during step (d), compacting, a pressure of 10 MPa to 20 MPa or of at least 15 MPa is applied to the mixture.

According to various advantageous embodiments of the invention, during step (d), compacting, a compression force is applied to the mixture for 30 minutes to 90 minutes, in various instances for 60 minutes.

According to various advantageous embodiments of the invention, the mould comprises a receptacle and a piston compacting the mixture in the receptacle during step (d), compacting, and in various instances during step (c), degassing.

According to various advantageous embodiments of the invention, the heat capacity of the mould is greater than or equal to twice the heat capacity of the mixture contained in the mould.

According to various advantageous embodiments of the invention, the heat capacity of the mould is greater than or equal to three or five or seven or ten times the heat capacity of the mixture contained in the mould.

According to various advantageous embodiments of the invention, the mass of the mould is greater than or equal to five times or to ten times the mass of the mixture.

According to various advantageous embodiments of the invention, the mould is made of metal, notably of steel, for example of stainless steel.

According to various advantageous embodiments of the invention, the filler comprises nickel and/or silicon and/or aluminium.

According to various advantageous embodiments of the invention, the compression force during step (c), degassing, is configured to apply a pressure of at least 15 MPa to the mixture.

According to various advantageous embodiments of the invention, during at least one or each cycle, the release of the compressive force lasts between 1 second and 5 minutes, or between 5 seconds and 1 minute, or between 10 seconds and 30 seconds.

According to various advantageous embodiments of the invention, at the end of step (d), compacting, the solidified abradable seal forms an angular segment of an annulus.

In various embodiments the invention provides a method of manufacturing a turbomachine comprising an abradable seal obtained according to a production method; wherein the production method is in accordance with the invention, the turbomachine in various instances comprising a low-pressure compressor, the abradable seal being a seal of the said low-pressure compressor.

According to various advantageous embodiments of the invention, the method of manufacture comprises a step (i), supplying or producing a support, and a step (ii), fixing of the abradable seal derived from the production method to the support.

According to various advantageous embodiments of the invention, step (ii), fixing, comprises a bonding or a welding or a riveting operation.

In general, the advantageous embodiments of each subject of the invention can also be applied to the other subjects of the invention. Where possible, each subject of the invention can be combined with the other subjects. The subjects of the invention can also be combined with the embodiments of the description which, in addition, can be combined with each other.

The invention increases the strength of the abradable seal in terms of its ability to resist contact with the rotor. In particular, the mechanical strength and corrosion resistance are improved. The seal becomes more durable, thereby optimizing turbomachine safety. In particular, the seal obtained exhibits optimal durability in the context of a turbojet engine low-pressure compressor, the operating temperature of which is comprised between −50° C. and +50° C., and which remains at around −50° C. during cruising flight. Moreover, the abradable seal makes it possible to meet the ingestion criteria when the blades are made of titanium, for example on a monobloc rotor.

The method according to the invention offers an end-material that is more homogeneous on a granular scale. The filler penetrates the matrix better. The tendency of the matrix grains to agglomerate decreases, as does that of the grains of the filler. At the same time, the invention may allow better encapsulation of the grains of the filler. For example, the metal grains become encapsulated better, thereby improving corrosion resistance.

DRAWINGS

FIG. 1 depicts an axial turbomachine according to various embodiments of the invention.

FIG. 2 sketches a portion of the turbomachine of FIG. 1 according to various embodiments of the invention.

DETAILED DESCRIPTION

In the description which will follow, the terms internal and external refer to positions with respect to the axis of rotation of an axial turbomachine.

Figure 1:
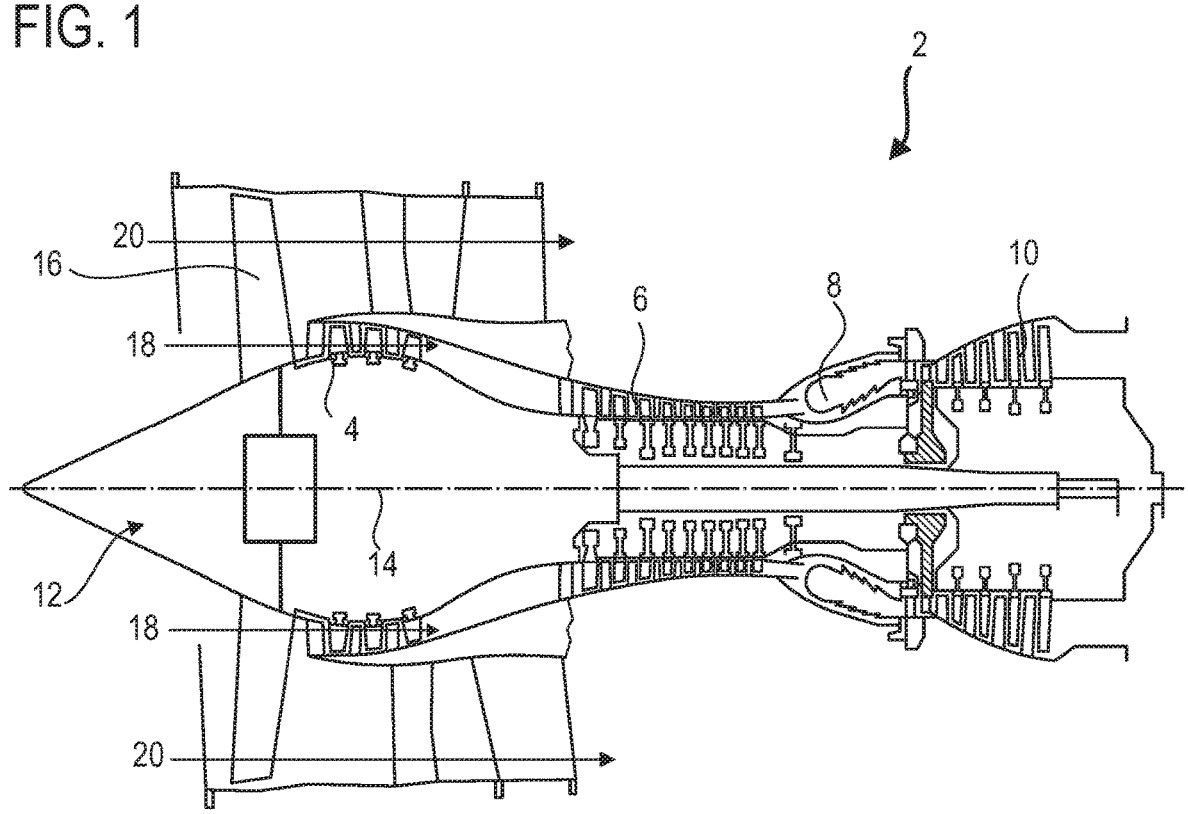

FIG. 1 is a simplified depiction of an axial turbomachine. In this exemplary embodiment it is a bypass turbojet engine. The turbojet engine 2 comprises a first compression stage, referred to as the low-pressure compressor 4, a second compression stage, referred to as the high-pressure compressor 6, a combustion chamber 8 and one or more turbine stages 10. In operation, the mechanical power of the turbine 10 transmitted via the central shaft to the rotor 12 sets the two compressors 4 and 6 in motion. These compressors comprise several rows of rotor blades associated with rows of stator blades. The rotation of the rotor 12 about its axis of rotation 14 thus makes it possible to generate an air flow and to compress the latter gradually until it enters the combustion chamber 8.

An inlet ventilator commonly referred to as a fan or blower 16 is coupled to the rotor 12 and generates an air flow which splits into a primary flow 18 passing through the various aforementioned stages of the turbomachine, and a secondary (bypass) flow 20 that passes along an annular duct (depicted in part) along the machine to then rejoin the primary flow at the turbine outlet. The secondary or bypass flow may be accelerated so as to generate a thrust reaction of use in the flight of an aeroplane.

Around the fan 16, just as around the compressor or turbine rotor blades, the turbomachine has several annular abradable seals. These abradable seals are designed to collaborate by abrasion with the radial tips of the blades and respectively of the fan, by disintegrating so as to limit the wear and damage to the said tips. Thanks to this safety measure, it becomes possible to reduce the safe radial clearances between the blades and their seals and therefore reduce recirculations. Efficiency increases as a result.

Figure 2:
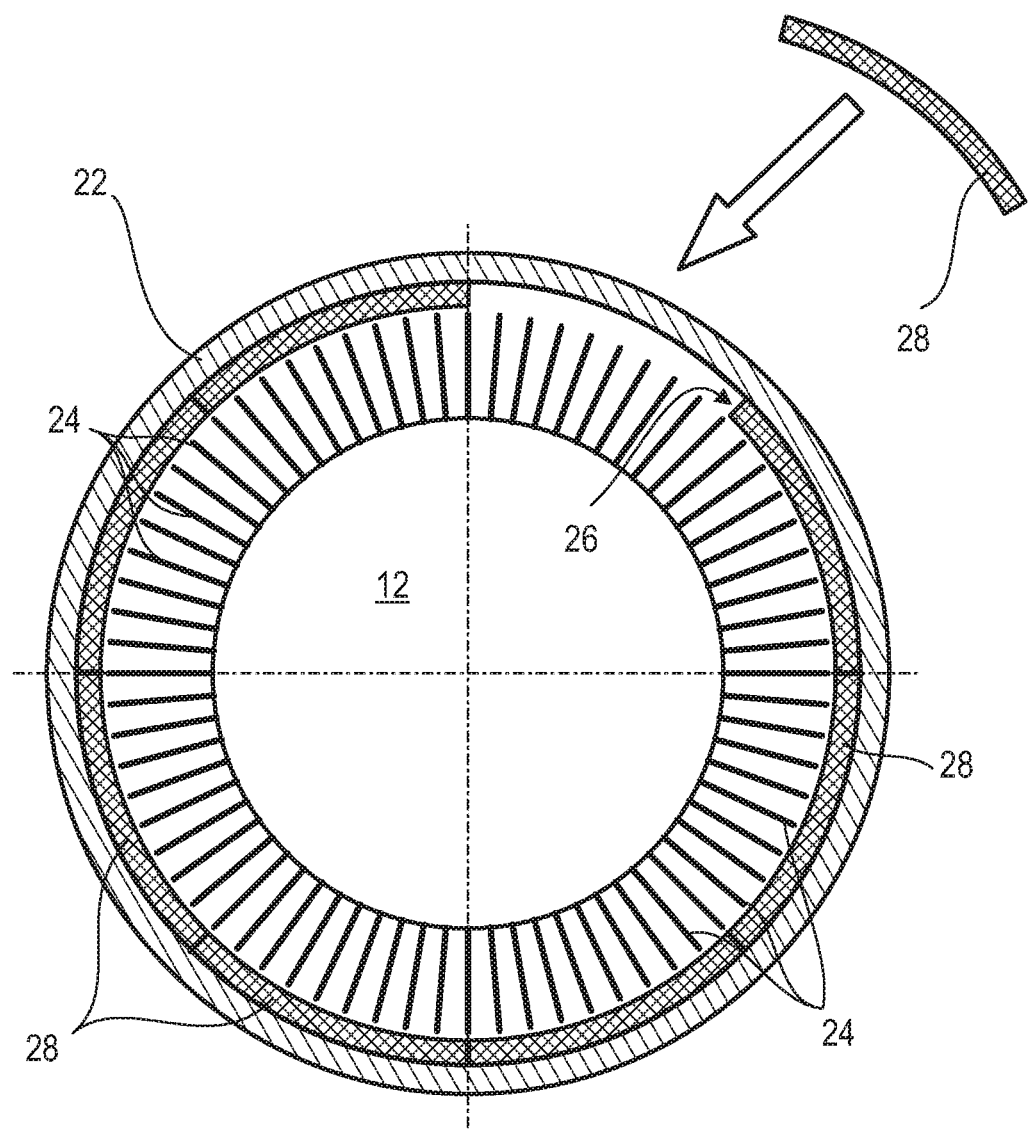

FIG. 2 is a view in cross section of a portion of the turbomachine shown in connection with FIG. 1. In various instances it can be a portion of a compressor, in various instances the low-pressure compressor. The present teachings can also be applied to the high-pressure compressor just as they can to the fan.

The rotor 12 is surrounded by a stator casing 22. It comprises an annular row of rotor blades 24 extending radially as far as the internal surface of the casing 22. This internal surface is lined with an annular abradable seal 26 which encircles the row of rotor blades 24. The radial proximity of the seal 26 to the blades 24 allows dynamic sealing.

FIG. 2 also shows one step in the method of manufacturing the turbomachine in which an angular segment 28 is fixed inside the casing 22. In various instances, the segmented abradable seal 26 is made up of eight segments 28, each of them having a curved plate shape; or alternatively a tile shape. Each segment 28 can exhibit two curvatures. By way of example, the developed length of the segment comprises between 20 cm and 40 cm, in various instances between 25 cm and 35 cm inclusive. The width can comprise between 5 cm and 15 cm inclusive.

Figure 3:
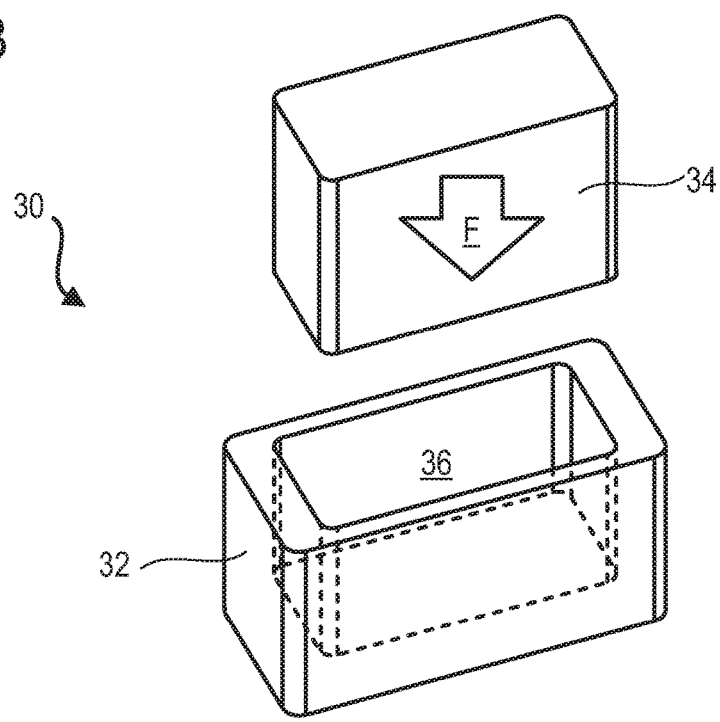
FIG. 3 illustrates a mould used for the hot compacting of an abradable seal according to various embodiments of the invention.

FIG. 3 sketches the mould 30 used to produce the abradable seal, in various instances for example in the form of angular segments.

The mould 30 comprises a receptacle 32 and a piston 34, the shape of which complements the internal cavity 36 of the receptacle 32. To create an abradable-seal segment, a precursor mixture (not depicted) is used in the internal cavity 36, then the mould 30 is closed again, introducing the piston 34 into the internal cavity 36.

In order to limit adhesion to the mould and therefore simplify demoulding, the lower face of the piston 34, like the internal surface which defines the internal cavity 36, are covered with an aluminium gauze (not depicted).

The mould can be made of metal, notably of stainless steel. Its mass and heat capacity allow heat energy to build up and then allow heat energy to be exchanged with the mixture.

The piston 34 is introduced with vertical force F so that it exerts a predetermined pressure on the mixture for a desired length of time. Through a thermal and/or physico-chemical phenomenon, the mixture hardens so that a solid is produced. The seal segment materializes.

Figure 4:
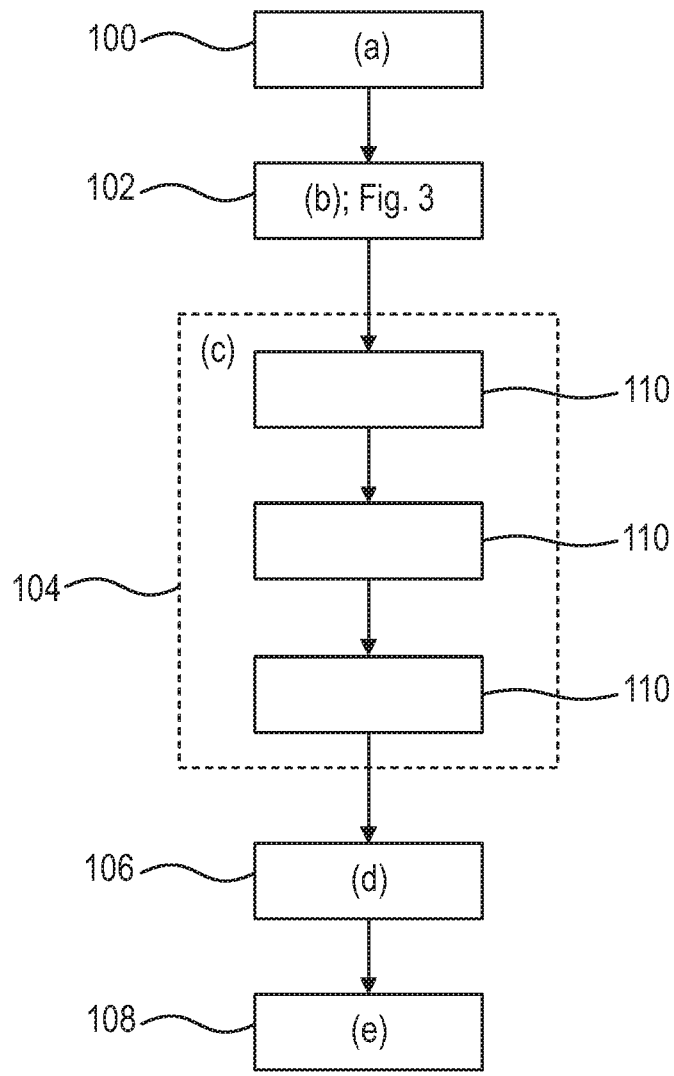
FIG. 4 is a diagram of the method of producing an abradable seal in a mould according to various embodiments of the invention.

FIG. 4 shows the method of producing an abradable seal in a mould. The mould can correspond to that shown in FIG. 3, and the abradable seal can correspond to the one illustrated in connection with FIGS. 1 and 2.

In various embodiments, the method can comprise the following steps; in various instances carried out in the following order;
(a) preheating 100 the mould;
(b) filling 102 the mould with a mixture, in various instances a powdery mixture;
(c) degassing 104 the mixture in the mould;
(d) compacting 106 the mixture in the still-hot mould so as to solidify the mixture in the mould, in various instances so as to form an abradable seal angular segment;
(e) demoulding 108 the abradable seal angular segment.

Step (a), preheating 100 of the mould, comprises the preheating of the mould to at least 500° C. for 3 hours, something which makes it possible to ensure that the mould increases in temperature and stores up heat energy that it will use later. This heating can be performed in an oven. At the end of this step, the mould can reach 500° C.

In step (b), filling 102, the precursor mixture can be in the form of a powder or of a mixture of powders. The mixture can comprise a filler and a matrix. By way of example, it can comprise a metal filler and/or a polymer matrix. The matrix can represent between 5% and 50% of the mass of the mixture, the rest being made up by the filler. The matrix can comprise polyester and/or hexagonal boron nitride, and/or calcium fluoride.

The filler can comprise, by mass, 20% to 45% nickel. The filler can comprise, by mass, from 5% to 20% silicon. The filler can comprise, by mass, from 55% to 80% aluminium. In the invention, the intervals include the end points. Other metals can be used with a view to improving the mechanical strength and corrosion resistance.

Because of its mass and its material, the mould can have a heat capacity greater than or equal to fifteen times the heat capacity of the mixture contained in the mould. It is therefore able to effect a significant exchange of heat with the mixture it contains. It temperature can remain above 100° C. for at least one hour, or at least during step (d), compacting 106.

Step (c), degassing 104, comprises three degassing cycles 110. Each cycle 110 comprises application of a compression force to the mixture in the mould then release of said compression force. During the cycles, the compression force is maintained for between 1 second and 10 minutes inclusive. The compression force can make it possible to apply a vertical compression stress of 15 MPa to the mixture. The release of the compression force can last between 1 second and 10 minutes inclusive. Step (c), degassing 104, remains optional. It makes it possible to increase the density of the abradable seal and therefore to achieve certain predetermined performance behaviours.

Step (d), compacting 106, is performed at ambient temperature, for example at between 20° C. and 25° C., and in various instances in ambient air for reasons of economy. It is performed as soon as possible after step (b), filling 102, and in various instances after the optional step (c), degassing 104, in various instances so as to limit the cooling of the mould in the ambient air. Step (d), compacting 106, can begin less than 10 minutes, or less than 3 minutes, or less than 20 seconds, after step (a), preheating 100. Once again, a vertical pressure is applied to the mixture using the piston. A pressure of 1 MPa to 50 MPa can be exerted. The static compacting pressure can be equal to 15 MPa. This pressure can be maintained continuously for 1 hour.

Because the mould remains hot after its preheating, step (d), compacting 106, allows a hot-compacting of the mixture, and therefore a thermal hardening of the mixture which agglomerates. The mould releases its stored heat to the mixture. The temperature of the mould decreases progressively as that of the mixture increases, and then is maintained at that of the mould. By virtue of the invention, the heating means can remain simple, in various instances small in size. Furthermore, the invention requires other means for applying the compacting force which remains simple and economical. The control and actuating means are simple and economical also. The temperature and size constraints remain easy to handle.

Step (d), compacting, can be a sintering step. The aforementioned steps can be adapted to form a moulding method.

Figure 5:
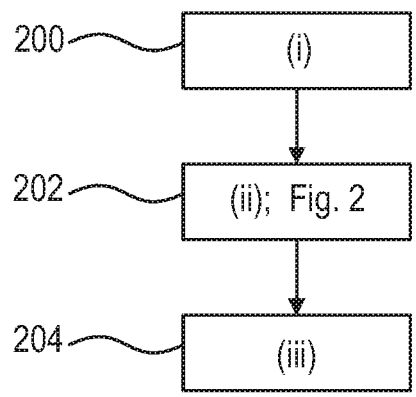
FIG. 5 is a diagram of the method of manufacture of a turbomachine according to various embodiments of the invention.

FIG. 5 is a diagram of the method of producing a turbomachine that can correspond to the one detailed in FIG. 1. The abradable seal, or at least the segment, can be produced according to the method described in FIG. 4.

The method of producing the turbomachine can comprise the following steps:
(i) supplying or producing 200 a support, in various instances a turbomachine casing, and (ii) bonding 202, inside the support, the abradable seal derived from the production method detailed in FIG. 4;

(iii) mounting 204 a turbomachine rotor level with the abradable seal.

Step (ii), bonding 202, is repeated so that the annular segments describe a closed loop. The bonding method is attractive in the context of a casing made of a composite material with an organic matrix and a fibrous reinforcement. FIG. 2 can correspond to this step (ii) of bonding 202, although the presence of the blades and of the rotor to execute it remains optional.

At step (iii) mounting 204, the seal provides sealing with the rotor. The seal can encircle the rotor. The rotor can be placed or assemble within the seal.

What is claimed is:

1. A method for producing a turbomachine abradable seal in a mould, wherein the mould comprises a cavity with an internal surface, wherein said method comprises the following steps:
    preheating the mould;
    during step preheating, covering the internal surface of the cavity with an anti-adhesive aluminium foil;
    after step preheating, filling the cavity with a mixture;
    after step filling, compacting the mixture in the cavity so as to solidify the mixture in the cavity; and
    demoulding the turbomachine abradable seal formed by the solidified mixture without the aluminium foil.

2. The method according to claim 1, wherein the step of preheating of the mould, comprises heating of the mould to at least 300° C.

3. The method according to claim 1, wherein the step of preheating of the mould comprises heating the mould for at least 2 hours.

4. The method according to claim 1, wherein the method further comprises a step of degassing the mixture in the mould, wherein the step of degassing is performed before step of compacting.

5. The method according to claim 4, wherein the step of degassing, comprises at least one cycle of applying a compression force to the mixture in the mould then a release of the compression force.

6. The method according to claim 4, wherein during at least one or each cycle, the compression force is maintained for between 1 second and 5 minutes.

7. The method according to claim 1, wherein the step of compacting is performed at most 15 minutes after the step of preheating.

8. The method according to claim 1, wherein during the step of compacting, a pressure of 10 MPa to 20 MPa is applied to the mixture.

9. The method according to claim 1, wherein during the step of compacting, a compression force is applied to the mixture for 30 minutes to 90 minutes.

10. The method according to claim 1, wherein the mould comprises a receptacle and a piston compacting the mixture in the receptacle during the step compacting.

11. The method according to claim 1, wherein the mixture comprises a filler and a matrix, the mass of the matrix representing between 5% and 50% of the mass of the mixture.

12. The method according to claim 11, wherein the filler comprises between 20% mass and 45% mass nickel; and between 55% mass and 80% mass aluminium.

13. The method according to claim 11, wherein the filler comprises between 20% mass and 45% mass nickel; and between 5% mass and 20% mass silicon.

14. The method according to claim 11, wherein the matrix comprises calcium fluoride.

15. The method according to claim 1, wherein the step of preheating of the mould comprises heating the mould for at least 3 hours.

16. The method according to claim 1, wherein the cavity has a shape of a ring or of a portion of a ring.

* * * * *